(12) United States Patent
Liao

(10) Patent No.: US 7,743,191 B1
(45) Date of Patent: Jun. 22, 2010

(54) ON-CHIP SHARED MEMORY BASED DEVICE ARCHITECTURE

(75) Inventor: Heng Liao, Belcarra (CA)

(73) Assignee: PMC-Sierra, Inc., Santa Clara, CA (US)

( * ) Notice: Subject to any disclaimer, the term of this patent is extended or adjusted under 35 U.S.C. 154(b) by 63 days.

(21) Appl. No.: 11/961,402

(22) Filed: Dec. 20, 2007

(51) Int. Cl.
*G06F 13/00* (2006.01)

(52) U.S. Cl. ...................... 710/240; 711/151

(58) Field of Classification Search ......... 710/110–113, 710/116, 121, 123, 308–310, 316, 317, 240–242, 710/244, 246; 711/148, 150, 151, 168, 209
See application file for complete search history.

(56) References Cited

U.S. PATENT DOCUMENTS

| | | | |
|---|---|---|---|
| 5,524,235 A * | 6/1996 | Larson et al. | 711/151 |
| 5,784,698 A * | 7/1998 | Brady et al. | 711/171 |
| 6,124,868 A * | 9/2000 | Asaro et al. | 345/558 |
| 6,601,134 B1 | 7/2003 | Yamagami et al. | |
| 6,693,950 B2 | 2/2004 | Fishman et al. | |
| 6,912,687 B1 | 6/2005 | Gates et al. | |
| 7,020,731 B2 | 3/2006 | Fujimoto et al. | |
| 7,028,297 B2 | 4/2006 | Horn et al. | |
| 7,107,343 B2 | 9/2006 | Rinaldis et al. | |
| 7,124,207 B1 | 10/2006 | Lee et al. | |
| 7,133,940 B2 | 11/2006 | Blightman et al. | |
| 7,167,949 B2 | 1/2007 | Yamagami et al. | |
| 7,353,362 B2 * | 4/2008 | Georgiou et al. | 712/33 |
| 2004/0236889 A1 * | 11/2004 | Kim | 710/113 |
| 2007/0266196 A1 * | 11/2007 | Torii | 710/309 |
| 2008/0005437 A1 * | 1/2008 | Gupta et al. | 710/241 |
| 2008/0034139 A1 * | 2/2008 | Han et al. | 710/110 |
| 2008/0235415 A1 * | 9/2008 | Clark et al. | 710/105 |
| 2008/0244135 A1 * | 10/2008 | Akesson et al. | 710/241 |

* cited by examiner

*Primary Examiner*—Khanh Dang
(74) *Attorney, Agent, or Firm*—Curtis B. Behmann; Borden Ladner Gervais LLP (57) ABSTRACT

A method and architecture are provided for SOC (System on a Chip) devices for RAID processing, which is commonly referred as RAID-on-a-Chip (ROC). The architecture utilizes a shared memory structure as interconnect mechanism among hardware components, CPUs and software entities. The shared memory structure provides a common scratchpad buffer space for holding data that is processed by the various entities, provides interconnection for process/engine communications, and provides a queue for message passing using a common communication method that is agnostic to whether the engines are implemented in hardware or software. A plurality of hardware engines are supported as masters of the shared memory. The architectures provide superior throughput performance, flexibility in software/hardware co-design, scalability of both functionality and performance, and support a very simple abstracted parallel programming model for parallel processing.

16 Claims, 7 Drawing Sheets

FIG. 7

ON-CHIP SHARED MEMORY BASED DEVICE ARCHITECTURE

FIELD OF THE INVENTION

The present invention relates generally to computer storage. More particularly, the present invention relates to controller devices for computer storage.

BACKGROUND OF THE INVENTION

In computing, specifically computer storage, a redundant array of independent (or inexpensive) drives (or disks) (RAID) is an umbrella term for data storage schemes that divide and/or replicate data among multiple hard drives. They offer, depending on the scheme, increased data reliability and/or throughput.

Fundamentally, RAID combines multiple hard disks into a single logical unit. There are two ways this can be done: in hardware and in software. Hardware combines the drives into a logical unit in dedicated hardware which then presents the drives as a single drive to the operating system. Software does this within the operating system and presents the drives as a single drive to the users of the system. RAID is typically used on servers but can be used on workstations. This is especially true in storage-intensive computers such as those used for video and audio editing.

Three of the concepts used in RAID are mirroring, striping and error correction. Using mirroring, data is copied to more than one disk. Using striping, data is split across more than one disk. For error correction, redundancy coding, such as XOR parity and/or Reed-Solomon code, methods are used to protect data in case of device failure. Different RAID levels use one or more of these techniques, depending on the system requirements.

A hardware implementation of RAID requires at a minimum a special-purpose RAID controller. On a desktop system, this may be a PCI (peripheral communications interface) expansion card, or might be a capability built in to the motherboard. In industrial applications the controller and drives are provided as a stand alone enclosure. The drives may be IDE/ATA, SATA, SCSI (Small Computer Systems Interface), SSA, Fiber Channel (FC), or any combination thereof. The using system can be directly attached to the controller or, more commonly, connected via a storage area network (SAN). The controller hardware handles the management of the drives, and performs any parity calculations required by the chosen RAID level.

The RAID controller is best described as a device in which servers and storage intersect. The controller can be internal to the server, in which case it is a card or chip. Alternatively, it can be external to the server, in which case it is an independent enclosure, such as a NAS (network-attached storage). In either case, the RAID controller manages the physical storage units in a RAID system and delivers them to the server in logical units (e.g., six physical disks may be used to ensure that one drive stays correctly backed up, but the server sees only one drive).

When the primary functional blocks of a RAID controller are integrated in a System On a Chip (SOC) VLSI device, they are often called RAID controller chip, or RAID-on-a-Chip (ROC).

Figure 1:
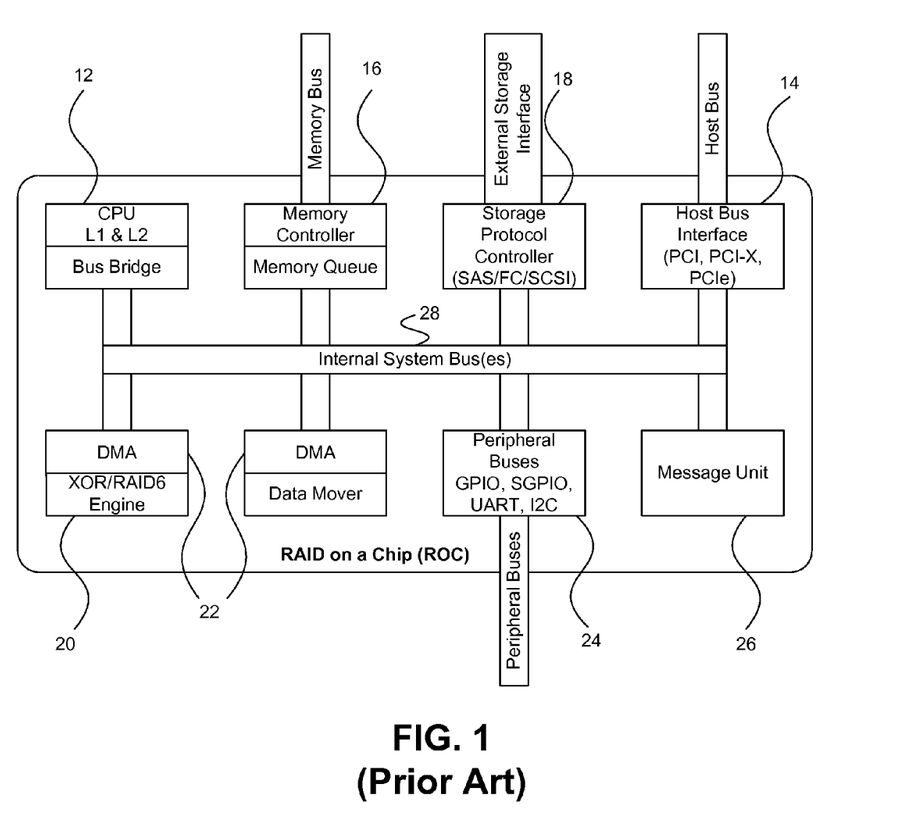
FIG. 1 illustrates the conceptual diagram of a typical architecture of a RAID on a chip.

FIG. 1 illustrates the conceptual diagram of a typical architecture of a ROC 10. Many of the current RAID controller SOCs implement variants or a subset of this basic architecture, including but not limited to the following devices: LSI 1078; Intel IOP333, Intel Sunrise Lake IO processor; AMCC PPC440.

The key components of this class of architecture include: a single CPU 12, typically a RISC based embedded processor core; Host bus interface 14, typically PCI, PCI-x, or PCIe interfaces; Memory interface or memory controller 16, typically DDR, or DDR-II interfaces; Storage Interface or Storage Protocol controller 18, typically SCSI, ATA, SATA, SAS, or Fibre Channel Interfaces; XOR or RAID6 engine 20; direct memory access (DMA) logic 22; Peripheral interfaces or buses 24 including UART, I2C, GPIO, SGPIO; and Message Unit 26 for communication between host CPU and the ROC CPU.

Within the ROC memory space there are two basic data types. The first type of data (Low Latency) is used for the control of data movement and includes ROC CPU instructions & data, DMA Engine status & control structures, Messaging Unit messages, and Storage Interface Controller status & control structures. The second data type (High Bandwidth) is Host Application Data. The second data type is never accessed by the ROC CPU. For disk drive status, drive control, and drive metadata, either a Low Latency or High Bandwidth path may be used, but both the producer and consumer of the data must use the same path.

An interconnect mechanism is required to handle the data movement/access of the two types of data structures, or data types, to satisfy the performance requirements for both types of data structures. Known architectures are all based on a system bus interconnect mechanism 28 to provide inter-block communication and to provide access the common memory spaces, including local (DDR) and host (PCI) memory space. Because many of the data structures and control structures are quite complex and significant in size, typically they are stored in DDR or PCI memory space.

The system bus interconnect mechanism 28 provides a method of arbitration to allow multiple blocks (including various hardware engines and the CPU) to access shared data and control structures. Typically, the system bus provides a peer-to-peer communication mechanism, wherein a number of system blocks perform an exclusive master function that generates a transaction request to an address space (e.g. ROC CPU). Some blocks perform an exclusive slave function (DDR memory controller) that receives and responds to transaction requests. Other blocks perform primarily a master functions (e.g. SAS controller, XOR engine) for data movement and access control structures, but also have an associated slave function for control and configuration purposes (e.g. control registers for DMA engine).

Some approaches employ a common internal fabric, in which the same fabric is used to support Low Latency traffic and High Bandwidth traffic, without treating these two types of access differently. This approach is typically used in earlier ROC implementation or systems with lower performance requirements. There are a number of ways to segregate Low Latency traffic from High Bandwidth traffic. Three such approaches are described briefly below.

1) Multiple internal fabrics—a portion is dedicated for Low Latency traffic and a portion is dedicated for High Bandwidth traffic. Masters of one fabric type would not be allowed to talk to slaves of the other type.

2) A more hybrid method is to have multiple fabrics, wherein portions are dedicated for Low Latency and other portions are dedicated for High Bandwidth. The determination of the particular fabric targeted is typically based on address or attributes.

3) The last is to have an internal bus structure where multiple virtual channels are created—one for High Bandwidth and the other for Low Latency traffic. For this architecture to work, the following features should be present: data packet size must be small (less than 256 bytes); support deep pipelining (due to small packet size); support out of order reads; support high priority Low Latency traffic arbitration, and reserved pipelining depth to always allow Low Latency requests to be made (reservation depth should be programmable). Virtual channel or fabric targeted selection is based on address or attributes.

Regardless of how the Low Latency and High Bandwidth requirements are met, targets or slaves that handle both types of traffic (PCI Modules & Memory Controller) must understand the different traffic types providing priority to Low Latency requests. Additionally, it should reserve resources for Low Latency requests. Both of these techniques ensure that a Low Latency request does not get delayed due to a large number of queued High Bandwidth requests.

The architecture of FIG. 1 has difficulties scaling towards higher RAID system performance requirements, as the speed of interfaces increases according to new protocol standards such as SAS-2 and PCIe Gen2. The main limitations include:

1. Lack of multi-processor support, which limits the RAID stack firmware performance as CPU cycles become saturated.

2. Even when multiple processors are added to the ROC architecture, the CPU performance is still hampered by fabric contention as they compete for access for DDR or other common resources.

3. Bus contention also occurs between the CPUs and the hardware engine DMA operations. This sequentializes many operations that can otherwise be executed in parallel.

4. Bus fabric typically causes Head of Line (HOL) blocking issues on concurrent transfers over different physical interfaces. For example, suppose a DMA master handles a top of the queue request to transfer data from DDR. If the DMA master faces a temporary contention on DDR, this causes subsequent transfers, which request data from PCI, to be blocked even though the PCI interface is completely idle in the mean time.

5. The fabric interconnected ROC architecture lacks a shared buffer resource that is accessible by all subsystems. This often leads to distributed small local buffer memory that is required by each subsystem. For example each Phy of the SAS controller requires a staging buffer for receiving and transmitting frames. The distributed buffer results in low memory utilization, low memory density (due to the small size of each buffer RAM), and large overhead for logic that handles the DFT (Design For Testability), ECC, and lack of flexibility for sharing of buffer resources across the local function block boundaries.

6. In a conventional ROC architecture, the off-chip DRAM (or host memory on PCI) is the only memory that is commonly accessible by all hardware engines and CPUs that provides sufficient capacity as data buffer or control structures. Consequently, the off chip memory is typically used as the operational space for CPUs and the hardware subsystems. In other words, the majority of control functions (such as exchange of descriptor and hardware context), and data functions (such as receiving frame, performing XOR computation, or encryption computation) is defined to be off-chip memory oriented (use off-chip memory as the storage space descriptor, source data, and result data). In order for any of those types of operations to be performed, the CPU or the hardware subsystems involved need to access memory. This intensive reliance on off-chip memory puts a heavy load on the memory bus, and consequently the system performance is bounded by how much memory bandwidth can be provided by the specific implementation. The contention for the off-chip memory bandwidth often leads to greater latency, and consequently idle waiting time in the CPU and the hardware engines. Through performance profiling, it was concluded that DRAM bandwidth is the typical system bottleneck in most conventional ROC architecture. Given that the DRAM bandwidth available to a ROC device is limited by the current state of the art of the DRAM technology, i.e. the width of the memory bus that is dictated by the cost point of the ROC solution, it is impractical to increase DRAM bandwidth beyond a certain established threshold at given design constraints. Hence the memory bottleneck becomes the ultimate limiter of scaling ROC system performance.

7. A further limitation of the off-chip memory oriented processing by the hardware engines is the lack of support of multi-pass processing of data. In a storage application, it is a common requirement for a block of data to be processed by multiple engines in a pipeline fashion. An example of such multi-pass processing is that data is fetched from DRAM buffer, a T10 DIF checksum and tag are computed and the AES encryption is applied to the data before the device writes the data into a target disk. To perform such a multi-pass operation, the conventional ROC architecture requires the data to be fetched from off-chip memory, processed, and then the intermediate results are written back to off-chip memory for each of the intermediate steps of the processing sequence. This results in data movement on and off-chip multiple times, consuming the critical memory bandwidth resource. The net result is lower system performance and higher power consumption for a given processor/memory speed.

8. A further common characteristic of the conventional ROC architecture is the lack of centralized DMA service that provides the data movement, address translation (such as handling of scatter-gather), and management of context switching (on transfers that involves part of a partial scatter gather buffer). Yet since most of the hardware processing subsystems perform operations on data blocks from external memory buffers, and write back results to external memory buffers, having a DMA function in each hardware processing subsystem (for directly accessing external memory interface) is a common design approach. This distributed DMA approach has the following shortcomings:

a. Repeated logic leads to greater gatecount and higher cost of the ROC system. In particular, the complexity of handling address-translation (scatter-gather) and the context saving/switching for partial scatter-gather buffer handling is repeated in each hardware subsystem that requires DMA function. The logic for handling of mis-aligned addresses, paging of data in and out of memory, endianness conversion etc is repeated. Any bug fixes in one subsystem may or may not be propagated to other subsystem's DMAs that have a similar design.

b. Distributed DMAs compete for access to external memory interfaces autonomously, leading to inefficient usage and sometimes unfair sharing of external memory bandwidth.

c. The distributed DMA approach often leads to divergences in the DMA features mentioned in a) over time of evolution of the design, resulting in inconsistency in programming interfaces for the various hardware engines, and results in difficulty in maintaining the hardware and software source code.

d. Distributed DMAs often require arbitration in the internal fabric, which leads to higher latency, and larger overhead for accessing external interfaces. This often leads to lower performance, and higher cost of buffering.

e. Conventional DMA operations are based on a physical address or the physical addressing of scatter-gather list without the notion of virtual address to physical address translation. The lack of virtual address DMA seriously complicates the design of the DMA master, particularly in the handling of context saving/switching among partial transfers.

To meet the increasing requirement of RAID on a Chip applications, the ROC architecture needs to evolve to address the following needs:

1. To scale up the raw CPU processing speed as represented by the number of instructions the ROC device can execute per second. Since the speeds of storage interfaces and PCI bus interfaces are accelerating at a faster rate than the increase in CPU processing speed offered by Moore's Law in recent years, a single embedded processor can no longer keep pace with the requirement of RAID processing. Consequently, the ROC architecture should support multiple processors on-chip.

2. To support new emerging application feature requirements for data security, data integrity, and more advanced RAID processing such as RAID6, the ROC architecture should support advanced hardware acceleration functions for data encryption, DIF (Data Integrity Field) as specified by T10 SBC standards, compression, hashing etc at very high data throughput.

3. To provide efficient & uniform DMA structure that presents a consistent representation of DMA operation and scatter/gather buffer definition that is capable of handling a large number of concurrent buffers and fast context switching among partial buffer transfers. Ideally the DMA operation should be consistent no matter which type of hardware and software acceleration/operation functions are applied to the data. The DMA also should be able to be non-blocking in order to fully utilize the bus bandwidth on system buses, storage interfaces, and on-chip and off-chip memory interfaces.

4. The ROC architecture should minimize the data traffic moving across external interfaces, specifically the off-chip memory interfaces, to resolve system performance bottleneck on memory bandwidth.

5. To have efficient on-chip system interconnect for the CPUs and the hardware engines, the DMAs should allow all processing engines and firmware programs to execute concurrently without blocking each other while competing for access for the system interconnect.

6. To support RAID processing without using an external DRAM interface. Ideally this can be done without significantly changing the software architecture of the RAID stack. This should be achieved either with on-chip memory resources or host memory resource in the PCI space.

7. To support multi-pass processing, wherein the data is processed by multiple hardware and/or firmware entities with flexibility on the type of operations applied without transferring the intermediate results off-chip and on-chip again between the processing steps, the sequence of the operation, and the capability of context switch amongst partial data processing that are associated with independent processing threads or I/O processes.

It is, therefore, desirable to provide an improved system on a chip architecture.

SUMMARY OF THE INVENTION

It is an object of the present invention to obviate or mitigate at least one disadvantage of previous system on a chip architectures, such as RAID on a chip.

The present invention provides a novel architecture for building ROC devices to deliver superior performance, flexibility and cost benefits.

In a first aspect, the present invention provides a system-on-a-chip device including a global shared memory switch, a processor complex subsystem and a memory interface controller. The global shared memory switch (GSM) includes on-chip shared memory resources to provide an interconnect mechanism among hardware components, processors and software entities. The processor complex subsystem is in communication with the GSM, and includes a high priority processor and one or more low priority processors. The memory interface controller, in communication with the GSM, manages memory access requests for a plurality of memory interfaces external to the processor complex subsystem. A dedicated low latency physical path is provided from the high priority processor to the memory interface controller to prioritize traffic from the high priority processor. An arbitrated physical path is provided from the low priority processors to the memory interface controller, the arbitrated physical path having a higher latency than the dedicated low latency physical path.

The GSM can be provided as a primary interconnect and buffering mechanism for both a control path and a data path. The GSM can arbitrate among a plurality of parallel masters to allow the plurality of parallel masters to concurrently access the shared memory resources. The GSM can include, or provide, a unified addressing scheme for all on-chip resources, such that each processor has equal access to the resources via the unified addressing scheme.

The plurality of memory interfaces can include a double data rate (DDR) memory interface and a peripheral component interconnect (PCI) memory interface, and each processor can have access to both DDR and PCI memory using the same addressing scheme.

The GSM can include on-chip GSM structures to store context, queue and buffer structures that are shared between processors and hardware controllers. The GSM can include buffer space based on large RAMs to provide shared RAM space across receive and transmit paths of multiple channels, permitting the buffer space to be flexibly reassigned or dynamically shared based on configuration or buffer sharing policy. The GSM can include GSM queues to communicate operation requests and/or operation results between a requestor and processing engines. The GSM can include GSM buffers to store the source and destination data blocks. The GSM can include context storage to store context information required to support concurrent operations.

The GSM can utilize parallel RAM instances to strip data in order to provide high aggregate on-chip shared memory bandwidth for concurrent access across multiple masters. The on-chip shared memory resources can include a global ring buffer including configurable sets of first in first out registers (FIFOs). The global ring buffer can provide hardware signals to indicates a status of the FIFOs within the ring buffer that can be routed and multiplexed to various GSM masters, so that the hardware operations/CPU interrupts/events can be triggered by ring buffer status change.

The GSM can include: a system wide GSM with high port count to connect all subsystems together; and a smaller GSM with ports only connecting to the CPUs and the storage interface controller subsystem to provide context and/or queue storage for the storage controller.

The dedicated low latency physical path can have low arbitration latency characteristics and low physical path latency to memory. The device can further include, for each CPU: a low speed arbitrated configuration bus for device configuration and maintenance, to provide accessibility from any CPU or external master to internal hardware configuration and status information without interference of high speed, high bandwidth control and data traffic.

The device can further include: an interrupt/event handler to categorize interrupt/event sources as latency critical and latency non-critical sources; and a direct crossbar to handle the latency critical sources and allow full programmability of connecting any critical interrupt source to any processor input pin. The can further include: an interrupt/event bus; and a plurality of interrupt/event gaskets, one for each processor, connected to the interrupt/event bus, each interrupt/event gasket providing programmable demultiplexing functions that allow each processor interrupt signal to take a value of a programmable time slot and bit position within the interrupt/event bus.

The system on a chip can be a controller for a redundant array of independent disks (RAID). In that case, the device can further include: an application accelerator to provide acceleration functions; and a storage interface controller to provide physical, phy, link and transport layer functions for one or more supported storage interfaces. The GSM can include on-chip GSM structures to store context information and queues used by the storage interface controller and/or the application accelerator. The storage interface controller can comprise a single or multiple phy SAS/SATA Protocol controller that provides phy/link/transport layer function for SAS and SATA protocol interfaces. The application accelerator can comprise RAID application acceleration engines that incorporate XOR, RAID-6, and cryptographic processing engines.

In another aspect, the present invention provides a system-on-a-chip device including a plurality of hardware engines including a critical master and one or more non-critical masters. A GSM is provided, including on-chip shared memory resources to provide an interconnect mechanism among the plurality of hardware engines. The GSM supports each of the plurality of hardware engines as masters of the shared memory resources. A memory interface controller, in communication with the GSM, manages memory access requests for a plurality of memory interfaces external to the plurality of hardware engines. A dedicated low latency physical path is provided from the critical master to the memory interface controller to prioritize traffic from the critical master. An arbitrated physical path is provided from the non-critical masters to the memory interface controller, the arbitrated physical path having a higher latency than the dedicated low latency physical path.

In a further aspect, the present invention provides a system-on-a-chip device including a plurality of hardware engines including a critical master and one or more non-critical masters. A GSM is provided, including on-chip shared memory resources to provide an interconnect mechanism among the plurality of hardware engines. The GSM supports each of the plurality of hardware engines as masters of the shared memory resources and provides a unified addressing scheme for all on-chip resources, such that each hardware engine has equal access to the resources via the unified addressing scheme. A memory interface controller, in communication with the GSM, manages memory access requests for a plurality of memory interfaces external to the plurality of hardware engines. The device can further include a direct memory access (DMA) engine to move data between the GSM and the plurality of memory spaces managed by the memory interface controller, which can include peripheral component interconnect (PCI) memory and double data rate (DDR) memory.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described, by way of example only, with reference to the attached Figures, wherein.

DETAILED DESCRIPTION

Generally, the present invention provides a method and architecture for SOC devices for RAID processing, or ROC. The architecture utilizes a shared memory structure as interconnect mechanism among hardware components, CPUs and software entities. The shared memory structure provides a common scratchpad buffer space for holding data that is processed by the various entities, provides interconnection for process/engine communications, and provides a queue for message passing using a common communication method that is agnostic to the implementation of the engines (e.g. whether they are implemented in hardware or software). In this architecture, a plurality of hardware engines are supported as masters of the shared memory, including but not limited to: one or multiple homogenous or heterogeneous CPUs; DMA engines that communicate with PCI, DDR or other memory interface types; SAS, SATA, FC, or SCSI storage controller engines; cryptographic engines supporting DES/AES in various modes; Public Key Acceleration Engines (PKA); RAID acceleration engine that does block XOR for RAID-5 and Dual parity RAID and Galois-Field multiplication-XOR engine for RAID-6.

The unique characteristics of this architecture provide superior throughput performance, flexibility in software/hardware co-design, scalability of both functionality and performance, and support a very simple abstracted parallel programming model for parallel processing. Although the primary application of the present invention is for ROC devices, it can be applied to other SOC devices with similar characteristics such as storage processors or network processors.

Some existing system level approaches to building RAID systems use the off-chip shared DRAM structure amongst multiple system components as system cache to improve on system design performance. However, there are inherent differences from embodiments of the present invention due to qualitative and quantitative differences between an off-chip interconnect and on-chip interconnect mechanisms for the following reasons:

1. The bandwidth provided by on-chip system bus/memory interfaces has an order of magnitude difference as compared to off-chip system bus or memory interfaces.

2. The cost of implementing an interconnect bus at high speed has an order of magnitude difference when the bus is on-chip versus an off-chip system.

3. The latency of an on-chip system bus has an order of magnitude difference with an off-chip system bus/memory interface.

4. The cost and power consumption of implementing a high port shared memory switch on-chip has an order of magnitude difference with an off-chip system.

5. The size of off-chip memory can be an order of magnitude higher than that of an on-chip memory.

6. The method of on-chip system bus/memory interface tends to be a simple low latency parallel on-chip bus while the method of off-chip high speed system bus tends to require sophisticated serial buses with sophisticated encoding, or parallel buses with a sophisticated clocking and timing scheme.

7. Due to the drastic latency/bandwidth/cost/memory size/port count of the on-chip and off-chip shared memory schemes, the purpose and usage model of the memory switch are drastically different. Particularly, the off-chip memory switch tends to have block-oriented access, while the on-chip memory switch supports more random access with smaller data units. An off-chip shared memory cache often is used to store common data strips that are commonly accessed by large symmetric RAID subsystems for synchronization purposes that are organized in large blocks and metadata. In contrast, the on-chip shared memory is used to provide a temporary data buffer for hardware engines and CPUs, to store messages and control descriptors for CPU and hardware subsystems, as well as common instruction codes and data space for on-chip processors.

Figure 2:
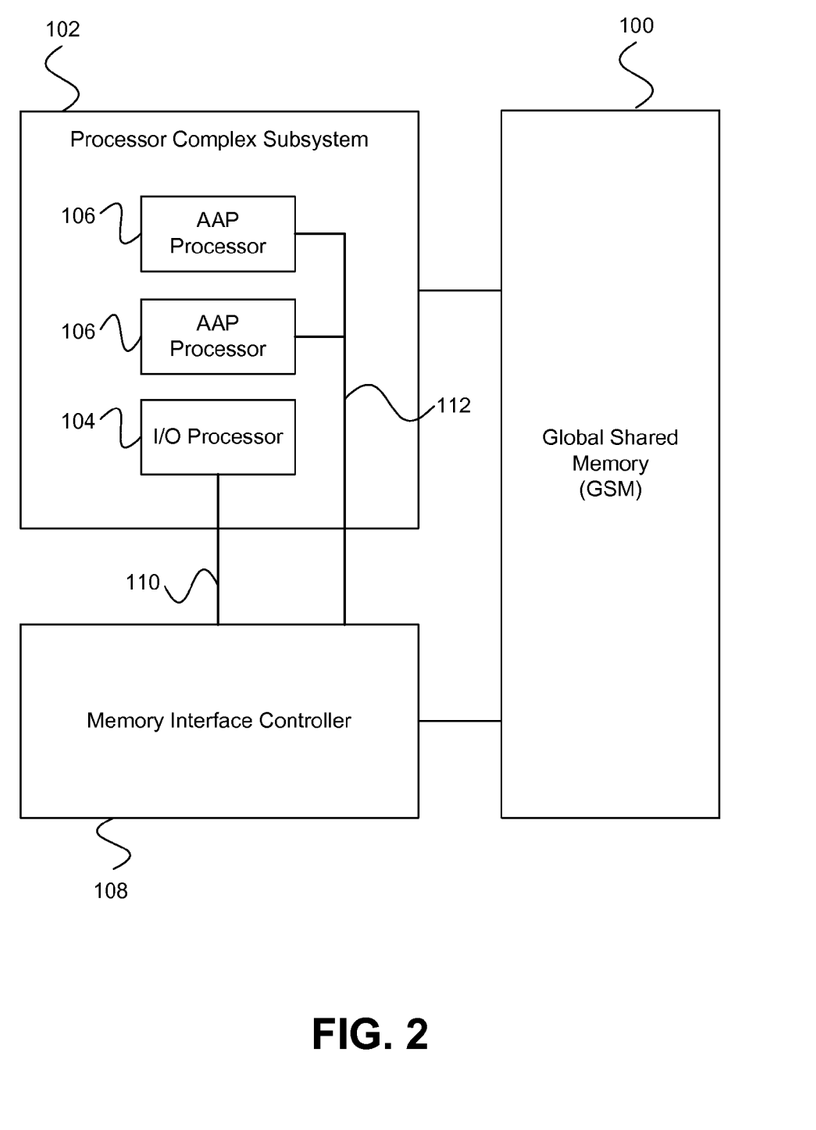
FIG. 2 illustrates a system on a chip architecture according to an embodiment of the present invention.

FIG. 2 illustrates a system on a chip architecture according to an embodiment of the present invention. The system-on-a-chip device includes a global shared memory switch (GSM) 100 including on-chip shared memory resources to provide an interconnect mechanism among hardware components, processors and software entities. A processor complex subsystem 102 is in communication with the GSM 100, and can include a high priority processor 104 and one or more low priority processors 106. A memory interface controller 108, in communication with the GSM, manages memory access requests for a plurality of memory interfaces external to the processor complex subsystem 102. Embodiments of the present invention utilize a number of interconnect mechanisms to optimize system performance. A dedicated low latency physical path 110 is provided from the high priority processor 104 to the memory interface controller 108 to prioritize traffic from the high priority processor. An arbitrated physical path 112 from the low priority processors 106 to the memory interface controller 108. The arbitrated physical path 112 has a higher latency than the dedicated low latency physical path 110.

The hybrid approach of using multiple types of interconnect including the shared memory is a distinct method applied by embodiments of the present invention, which optimizes each interconnect mechanism according to the type of access and type of data.

The GSM 100 provides extremely high on-chip raw memory bandwidth for control, descriptor, queue, and data access, at the same time provides a significant amount of on-chip memory as a data buffer for the CPU and hardware engines to handle single or multi-pass operations. By creating the dedicated low latency physical path 110 that has minimal multiplexing stages to external memory, this approach minimizes the pipeline stall penalty in the CPU, when accessing external memory spaces, when encountering a cache miss, or while performing uncached accesses. This path also prioritizes the high priority processor's traffic over the bulk data movement traffic, and the low priority processors' traffic.

It is well known that achieving low latency from CPU to memory spaces is essential for achieving high CPU pipeline efficiency. In a conventional system interconnect with multi-masters, inevitably, arbitration and multiplexing need to happen among the masters, resulting in longer average latency for all masters. Even though priority schemes could be applied to alleviate some of the arbitration latency for the high priority master, because of the physical propagation path, pipeline and multiplexing, clock domain synchronization latencies all contribute to the overall loop latency for a master to reach memory.

In embodiments of the present invention, one or more of the following schemes are preferably applied.

1. The dedicated low latency physical path 110, or system bus, supports multiple outstanding transactions. This supports instances where the high priority processor supports multiple outstanding reads and stall on reference. This minimizes cache miss pipeline stall penalty.

2. Based on system requirements, the most latency critical master (as in the main IO processor CPU to DDR memory) is selected or identified, and optimized for not only the arbitration latency, but also the physical path latency to memory.

3. The CPU has the option of running in the same clock domain as the memory controller to eliminate the clock domain crossing latency. Alternatively, the CPU clock can be run asynchronously, which requires the clock domain.

4. Create a dedicated physical path 110 from the critical master, such as the high priority processor 104, to the memory control and minimize the multiplexing/arbitration stages on that path. This allows the critical master to have minimal latency at the cost of higher latency of non-critical masters, such as low priority processors 106, through longer access path and DMA latency, which are either less performance critical, or can tolerate very high memory latency.

In a presently preferred embodiment, the different types of interconnect utilize the AXI bus protocol to ease the design and ensure reusability of each hardware IP. However, the general concept of the interconnect method is protocol agnostic and can be applied to other types of synchronous or asynchronous system bus protocols.

Embodiments of the present invention advocate the use of a processor complex with one or a plurality of processors. The processor complex 102 provides the CPU with the required horse power to execute RAID software/firmware. For a certain performance path (such as Random small read), the system performance is directly proportional to how fast the CPU can execute the fast path of the RAID software. Hence it can be important to be able to scale the processor performance.

Given a process technology, the raw CPU processing power is limited by a number of key factors, such as: the physical speed of the gates, register files, and embedded RAM; the processor architecture in terms of the number of instructions the given architecture can issue per cycle, the efficiency of the pipeline design and scheduling algorithms; how well the memory subsystem supports the processor as mentioned earlier; implementation method of the processor architecture (synthesizable soft core vs. custom-design hardcore). Once these factors are decided, the achieved processor performance is bounded to a finite level.

In the known architectures with a single processor, it is often found that the processor performance is the bottleneck that limits the system performance. To break-through the previously achieved system performance bound, a new method is needed to deliver higher overall processor performance.

Embodiments of the present invention support a single processor to be used to provide the firmware/software processing power. It also advocates the use of multiple processors, for example as shown in FIG. 2, either homogenous or heterogeneous to scale the CPU processing performance.

Figure 3:
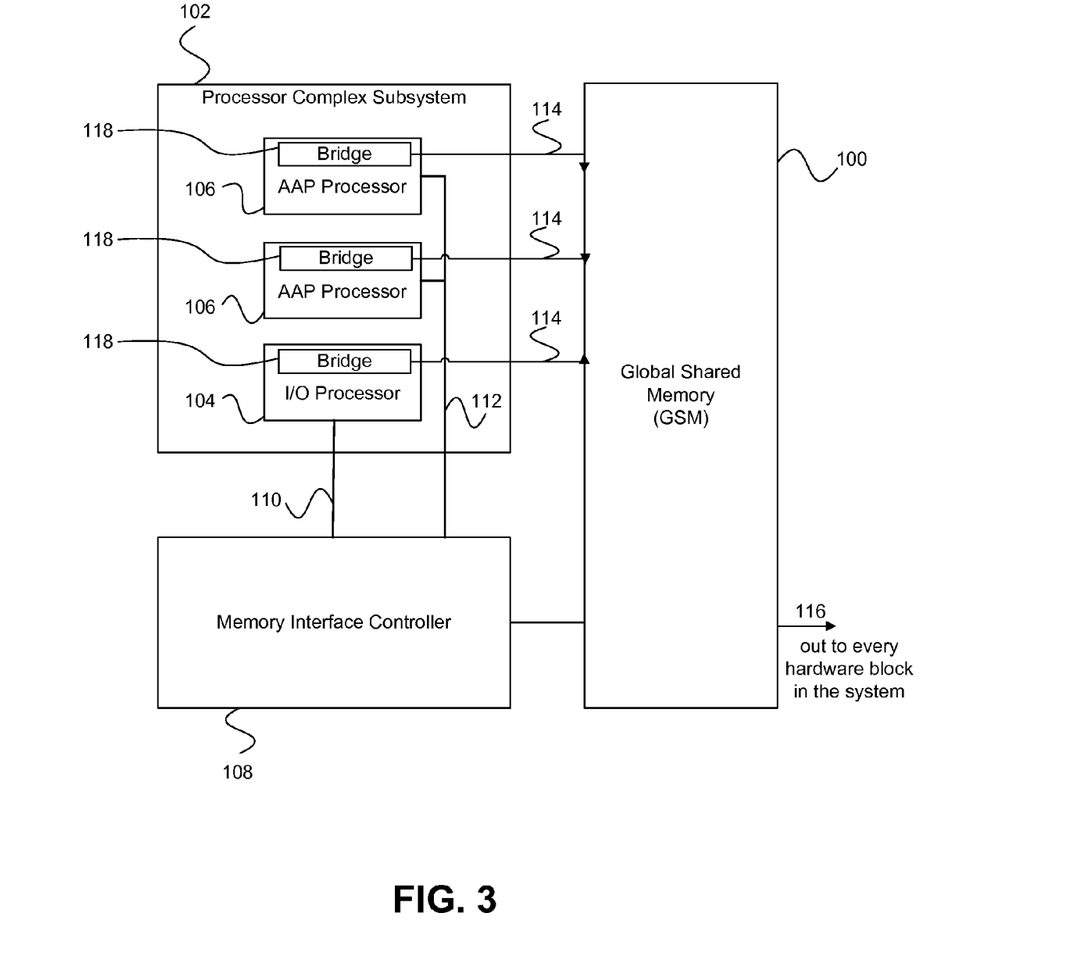
FIG. 3 illustrates a system on a chip architecture according to another embodiment of the present invention.

FIG. 3 illustrates a system on a chip architecture according to another embodiment of the present invention. The embodiment in FIG. 3 includes low speed arbitrated configuration buses, or configuration paths, 114 and 116. The configuration paths 114 are slave ports on the GSM, coming in from the processor to GSM, where the processor is the master, an the GSM is the slave. The low cost configuration buses, or control bus slaves, 114 provide the accessibility from any CPU or external master to internal hardware configuration and status information without interference of high speed, high bandwidth control and data traffic. In the processor complex subsystem 102, the configuration buses 114 go through a bridge 118 in each processor complex and interface directly from the bridge to the GSM. Each processor has its own a low speed configuration bus. Inside the GSM, there is an arbiter to arbitrate based on the outgoing port address. The configuration path 116 is a master port going out from the GSM to every other block in the system. The GSM receives requests from the configuration paths 114, arbitrates those requests, and grants access to the configuration path 116, or control bus master, which then goes to every single block in the system.

The processor complex 102 can take both interrupts and events as input signals that indicate changes of state in a hardware or software entity. Both types of signal are common nature as far as the source of the signal is concerned. But from the perspective of the processor, the interrupts and events are handled differently. When a processor receives an interrupt, it triggers an interrupt service routine in a well known fashion. The concept of an event is associated with a multi-threading processor. Typically, it is used to define a thread that waits for an event to occur before proceeding to the next stage. This is similar to a polling process that inspects the value of a memory location or a hardware register and waits for the value to meet a predetermined criterion before the process moves on to the next stage of processing.

Multi-threading processing utilizes events to achieve the same purpose without causing a CPU to waste cycles on polling. Instead, the thread creates a yield condition (typically implemented by a Yield instruction) on an event. When the processor executes the yield condition/instruction, the processor suspends the thread and moves on to execute other outstanding threads. When the event input is asserted, the processor wakes up the suspected thread and allows it to continue to execute past the point of the yield instruction. This method allows the processor to utilize the waiting period to execute useful instructions while waiting for the desired condition to occur. It is a very light overhead method of synchronization between hardware and software.

An embodiment of the present invention provides a novel method of routing sources of interrupts/events to a plurality of processors to provide symmetrical flexibility for mapping of interrupt tasks and threads to a processor. With the flexibility provided, the software programmer is not constrained by how the interrupt signals are connected to each processor in the actual hardware; hence the programmer has the flexibility to choose which processor to use to execute the interrupt or event handler.

In an embodiment of the present invention, there are a number of sources of events and interrupts, including: software setting interrupt/event request registers (software originated interrupts/events); hardware originated interrupt/events; and queue originated interrupts/events that are originated from the GSM ring buffer states. Given the commonality of the origination and routing of both types of signals, the interrupts and events are treated with a common method. Embodiments of the present invention involve a very large number of interrupt sources that run in the thousands. Typically, the processors have a limited number of interrupt/event inputs. To provide full flexibility of routing any interrupt/event source to any interrupt/event input of all of the available processors is a complicated issue. If not handled properly, it can causes a very large number of signals to traverse the silicon device, creating physical routing challenges and a high cost of multiplexing.

An embodiment of the present invention addresses this issue with a 2 tier approach. First, the interrupt/event sources are categorized into two classes: latency critical and latency non-critical. The latency critical sources are handled with a direct crossbar that allows full programmability of connecting any critical interrupt source to any input pin of the processors. All interrupt/event sources (including critical and non-critical) are time multiplexed into a narrow bus that is single-bit or multiple-bit wide over a fixed time period, which is called interrupt/event bus. The interrupt/event bus is connected to multiple interrupt/event gaskets, one per processor. The interrupt/event gasket provides programmable demultiplexing functions that allow each processor interrupt signal to take the value of a programmable time slot and bit position within the multiprocessor bus. This achieves the purpose of providing full flexibility of routing any interrupt source to any interrupt input to the processor. In an alternative embodiment, the interrupt gasket can implement further logical OR and AND function of multiple time slots to generate a single interrupt input and provide cause registers that is mapped to a plurality of interrupt time slots. In that case, the processor can inspect the value of the selected interrupt lines in the interrupt/event handler should the handlers require such knowledge.

Figure 4:
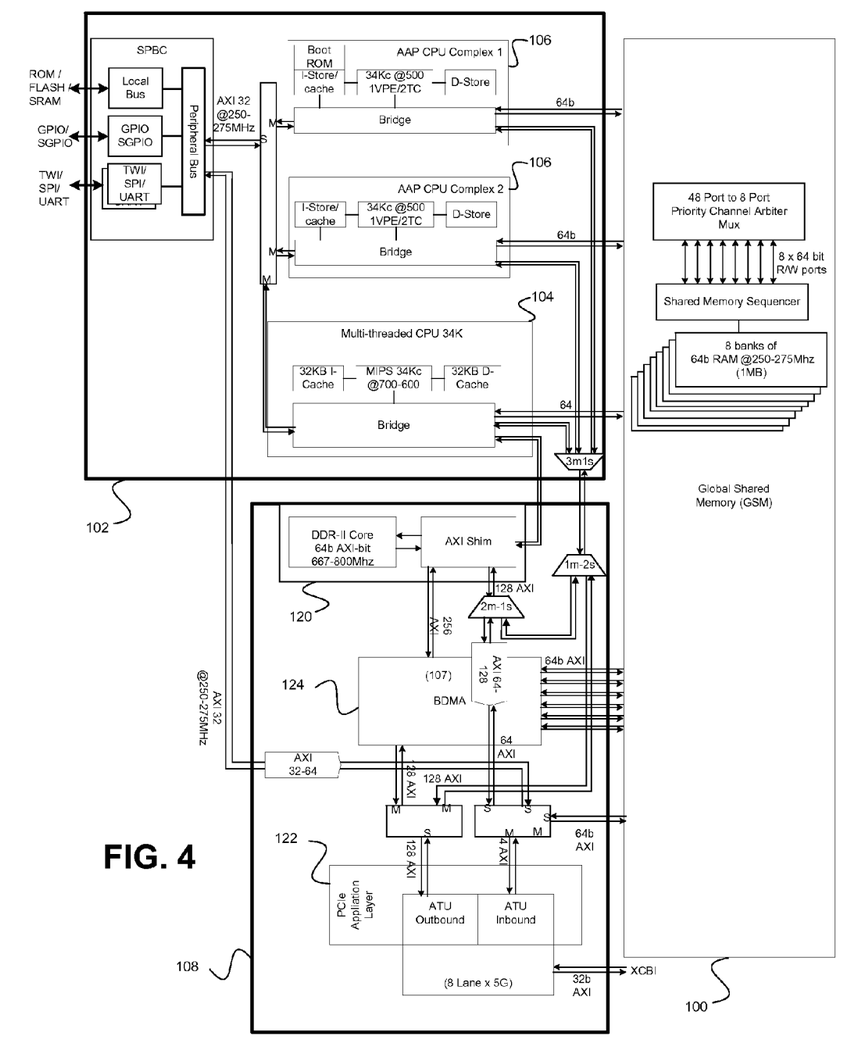
FIG. 4 illustrates a system on a chip architecture according to a further embodiment of the present invention.

FIG. 4 illustrates a system on a chip architecture according to a further embodiment of the present invention. Many details shown in FIG. 4 relate to an exemplary embodiment, and other variations are within the scope of this invention. In FIG. 4, the memory interface controller 108 is shown to include a double data rate (DDR) controller 120, a peripheral communications interface (PCI) controller 122, and a block direct memory access (BDMA) controller 124. Details regarding the BDMA controller can be found in U.S. Provisional Application Ser. Nos. 60/989,846 and 60/898,847 filed on Nov. 23, 2007, both of which are incorporated herein by reference. The processors 104 and 106 are also shown to include local memory, such as I-Store/cache and D-store.

FIG. 4 also illustrates a plurality of multiplexing/arbitration stages in the unoptimized path from the low priority processors to the memory interface controller, and the particular controllers therein. The arbitrated physical path with higher latency is shown in this embodiment as including a plurality of sub-paths, which can pass through common multiplexers.

As mentioned earlier, the processor(s) are tied to the rest of the system through the shared memory system interconnect, the low latency interconnect to the memory spaces, and/or the slow speed configuration bus.

In a presently preferred embodiment of the present invention, the processor(s) support hardware multi-threading, which increases processor performance by utilizing the pipeline more fully via context switching between software threads when the current threads experience a stall condition. It also supports efficient event handling by having threads yield and wait for an expected hardware event to occur and wakeup/resume execution after the event trigger. This provides opportunity to have low overhead of handling hardware trigger conditions when compared to conventional interrupt handling or polling mechanisms, both of with consume a significant amount of processor cycles as overhead.

In a presently preferred embodiment of the present invention, all processor(s) have a unified view of the shared resources at the system level, including but not limited to: shared memory space/ring buffer/semaphore provided by the GSM interconnect, the external memory space, the host memory space through PCI, the local bus peripheral register and buffer space, and the whole chip configuration register space. The unified access of shared resources allows flexible partition or migration of software threads to processors either statically or dynamically, because no matter which processor is chosen to run a software thread, the software thread has equal access to the shared hardware/system resources. This provides significant benefit for software development, performance tuning, and resource allocation.

In terms of the unified view of shared resources at the system level, this is enabled by the shared memory structure, which is by definition shared, so every processor has equal access to it. Every resource is presented through the shared memory, such as the memory space itself, the control bus, hardware FIFOs, using a unified addressing scheme. Since the shared memory provides equal access, each CPU sees the same memory map and has equal access to all of those resources.

The unified view of shared resources is also enabled by the fact that all three CPUs have access to the DDR controller, even though they may have different physical paths of access. The address of the DDR controller is presented to each CPU in the same way. In fact, all processors have access to both the DDR and PCI memory, and they are presented in the same way from an addressing point of view.

In an embodiment of the present invention, there are 4 memory spaces: GSM resources; DDR space; PCI memory space; and control space. All four memory spaces are addressable by each processor in the same way. One benefit of this is that if there is a job to be done which involves accessing a particular memory space, that job can be run on any of the processors, without any physical limitation of what that processor can address.

In the architecture according to an embodiment of the present invention, each processor can have a common/unified path/mechanism for accessing the shared memory/hardware resources (Unified Memory Access, or UMA), or a non-uniform path/mechanism for accessing the shared memory resources (NUMA). In the case of UMA embodiment of the present invention, all processors have equal performance/throughput/latency characteristics while accessing a common shared resource. In the case of NUMA, the performance characteristics of accessing a common shared resource can be different from processor to processor.

More specifically, in a presently preferred embodiment of the invention using shared memory as the primary system interconnect, each processor can have either the same or different priority while accessing the GSM resources. In the case of the low latency interconnect from CPUs to memory, some processors can have a dedicated lower latency path to an external memory space while others can use a longer latency path to access the external memory space. The choice of the priority of the path to external memory can be either statically predetermined, or software configurable at run time, or dynamically adjusted according to the type of data accessed. Having the NUMA can provide important options for performance tuning at the system level, such that each processor can be run with optimal configuration according to the type of software task and the type of data it is required to process.

In additional to globally shared resources (e.g. memory/hardware resources), each processor in the complex can have local resources, such as local memory, shown in FIG. 4 as I-Store/cache, I-Cache and D-Store. The local memory is preferably optimized to run in the same clock domain as the CPU and to be physically placed close to the CPU core. Both of these measures are designed to minimize the latency for CPU access.

To summarize, to have a complex multi-tier hierarchy of resources from the CPUs to the memory/hardware sources, both global and local shared resources can be important for system performance optimization. While known ROC architectures have opted for a simpler unified access model from CPU to all memory spaces/hardware resources, the complexity of the memory hierarchy in embodiments of the present invention allows it to outperform the conventional architecture at the instruction level. For example, suppose there is a piece of instruction code that needs to be accessed very fast. This instruction code would be put into the low latency local memory. If there are boot up or configuration instructions which can be run slowly, they can be placed in the DDR memory which is slower to execute.

Figure 5:
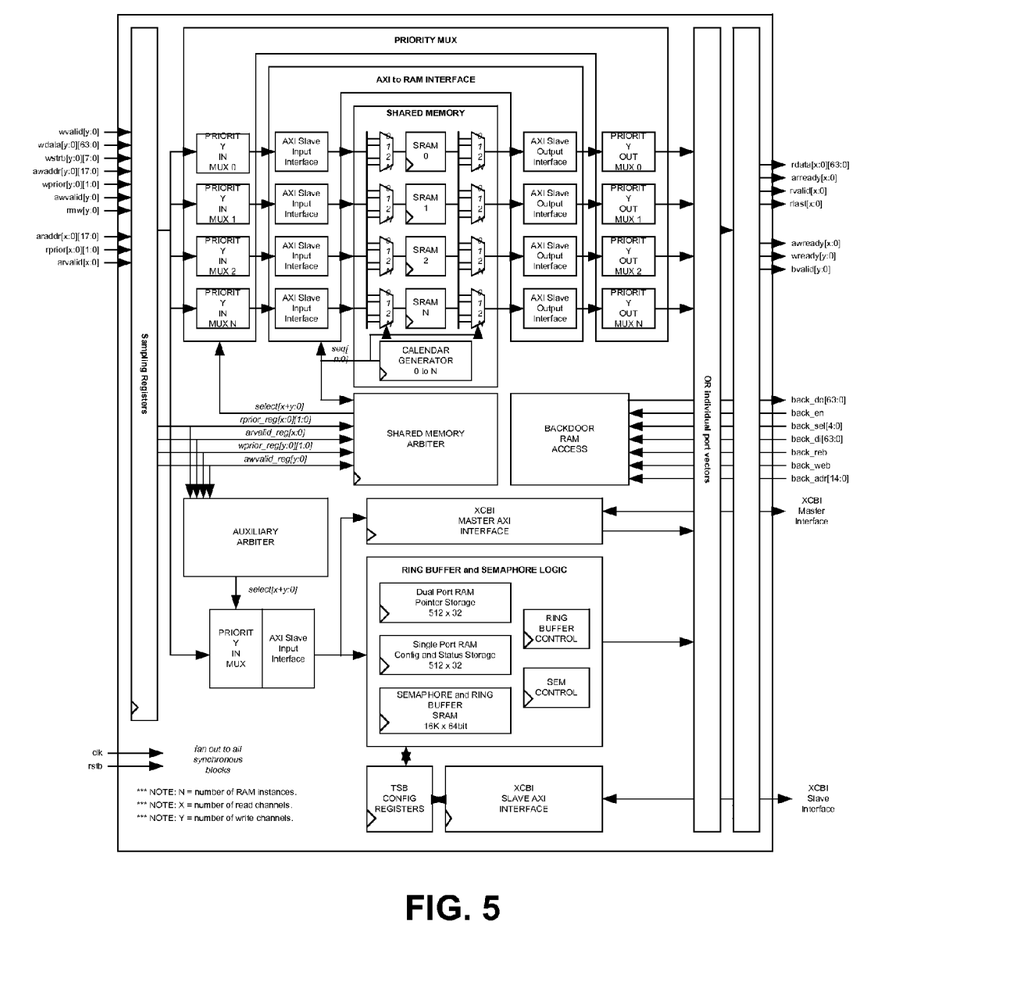
FIG. 5 illustrates a global shared memory switch according to an embodiment of the present invention.

FIG. 5 illustrates a global shared memory switch according to an embodiment of the present invention. The GSM shared memory 100 switch provides the primary interconnect mechanism. The GSM 101 interconnect utilizes parallel RAM instances to strip the data in order to provide very high aggregate on-chip shared memory bandwidth for concurrent access across multiple masters. The GSM 100 provides three categories of concurrent atomic services: data access, ring buffer access, and semaphore access. The GSM logic arbitrates among the parallel masters to allow a plurality of masters to concurrently access the shared memory resources. The number of simultaneous accesses is dictated by the internal resources of the GSM logic as explained further below. The ability to have multiple concurrent accesses is a feature that differentiates embodiments of the present invention from existing approaches, where arbitrated access to a common resource only allows a single master to access at any time, although multiple transfers can overlap some stage of the transfers concurrently. The GSM logic can ensure fairness and priority based on a multi-level priority round-robin arbitration scheme, although other arbitration schemes can be applied.

The total memory bandwidth for concurrent access is scalable as a function of the width of each RAM, the operating frequency of each RAM, and the number of RAM instances. The on-chip memory inside the GSM 100 can be implemented as regular 6 transistor SRAM, 1 transistor SRAM, or other on-chip RAM technology. Given a RAM technology, the total system bandwidth can be scaled linearly by increasing the number of parallel RAM instances. In a particular embodiment of the present invention, the total on-chip memory bandwidth achieved through the GSM 100 interconnect with 8 RAM instances is at least an order of magnitude higher than prior art bus interconnect architectures. Hence the system throughput can be an order of magnitude higher. The GSM 100 can support random access of the data words with either partial word access at byte granularity, single whole word access, or burst access of a plurality of consecutive words starting from random word address.

The GSM 100 supports ring buffer access, which provides a very fast/efficient platform for the CPUs and the hardware engines to communicate with each other. The ring buffers are configurable sets of FIFOs that can be organized as globally shared queues. Any master can read from or write to any FIFO. Each ring buffer has configurable location and depth with a shared resource of ring buffer memory. Each set of ring buffers can be organized as a single FIFO, a set of 2 non-overlapping FIFOs, or a set of 3 non-overlapping FIFOs all sharing the same ring buffer storage. The multi-stage FIFO organization is an ideal platform for managing a resource such as a frame buffer that inherently goes through a multi-stage life cycle: Free—for a buffer available to be used; Posted—for a buffer that has been filled and ready to be moved or consumed; and Completed—for a buffer that has been consumed or that has finished DMA transfer and ready to be free by the owner of the buffer. Because at any point in time, a buffer can be in any one of the 3 life cycle stages, the ring buffer 3-stage FIFO mechanism provides the holding place for the buffer pointer for it to be passed between the processing engines involved. The three FIFOs can share the same ring buffer storage resource. The common ring buffer being dynamically reconfigurable allows the resource to be sized and shared efficiently at the system level. Furthermore, because all buffers are globally accessible, the producer and consumer or each FIFO can be reconfigured and replaced dynamically, allowing the decoupling of the requester of a message from the consumer/handler of the request.

For example, normally, when the SAS engine executes a read I/O, the received data is put into a receive buffer, and the DMA request is posted into an inbound DMA post queue, triggering a request to the DMA engine to move the inbound data. When the system is required to perform a Read I/O followed by a decryption operation on the received data, the SAS engine will post the same DMA request into a DMA post queue after data is received, without the knowledge of which engine will processed/move the data. In this case (i.e. according to embodiments of the present invention), the encryption engine can read from the DMA post queue, trigger a data decryption operation on the data in the buffer, and then regenerate another DMA request into a actual DMA queue, which causes the DMA to perform the actual data movement on the decrypted data. Because the queues are globally accessible, this can easily be done by configuring the encryption engine to the consumer of the SAS request queue. Similarly, a CPU process can be the consumer/requestor of the queues, allowing a CPU firmware process to handle/request messages and participate in the processing of the data, without changing the hardware engines involved. Hence the flexible multi-pass chaining of operation is enabled by this global ring buffer mechanism. The GSM ring buffer provides hardware signals to indicates the status of the FIFOs within the ring buffer that can be routed and multiplexed to various GSM masters (hardware engines), so that the hardware operations/CPU interrupts/events can be triggered by ring buffer status change.

The GSM 100 provides a plurality of semaphore resources that are globally accessible by all masters that are address mapped. Each distinct word address within the semaphore address range corresponds to one independent hardware semaphore resource. A write operation to a semaphore clears the lock on the semaphore by setting the value of the semaphore to 0. A read operation to a semaphore address performs a test and lock function. The read operation to an unlocked semaphore that has a current value of 0 returns a value of 0, but also sets the lock on the semaphore (changing the internal hardware semaphore to the value of 1); a read operation to a semaphore that is currently locked (i.e. having value of 1) returns a value of 1, and the internal lock on the semaphore is unchanged. The global semaphore provides an atomic primitive operation to support management of critical resources and for implementing synchronization schemes among multiple masters such as CPUs processes in a uniprocessor/multi-threading environment, or multiprocessor/multi-threading environment.

For all three types of access, the GSM ensures the atomicity and consistency of the concurrent operations of the accesses from all concurrent masters. For example, two or more masters can perform read/write access to the same queue/semaphore/memory location at the same time, the GSM ensures that each read or write operation is performed atomically and always generates valid results without corruption of data.

The present invention supports the following embodiments:

1. The use of a single GSM as the primary system interconnect.

2. The use of multiple GSMs as system interconnects between subsystems, as well as inside subsystems. The storage capacity of the GSM, the internal bus width, and the port count of the GSM can be sized according to the requirements of the specific application. In a presently preferred embodiment, a system wide GSM with high port count is used to connect all the subsystems together; a smaller GSM with ports only connecting to the CPUs and the storage interface controller subsystem is used to provide context and/or queue storage for the storage controller. Because of the lower port count, the I/O context GSM has lower access latency, and because of the segregation of the I/O context structures from the main GSM, this approach prevents the context accesses generated by storage controller operation to contend other system level control and data traffic.

Also shown in FIG. 5 is an XCBI master interface, which is the arbiter for the configuration requests. There are multiple arbiters in the GSM 100. The shared memory arbiter arbitrates for access to the shared memory, which is essentially the top half of FIG. 5. The auxiliary arbiter arbitrates for the XCBI master interface, the ring buffer and semaphore logic. So, there are two arbiters side by side and they each arbitrate for different sets of resources: the memory portion; and the ring buffer and configuration elements.

Figure 6:
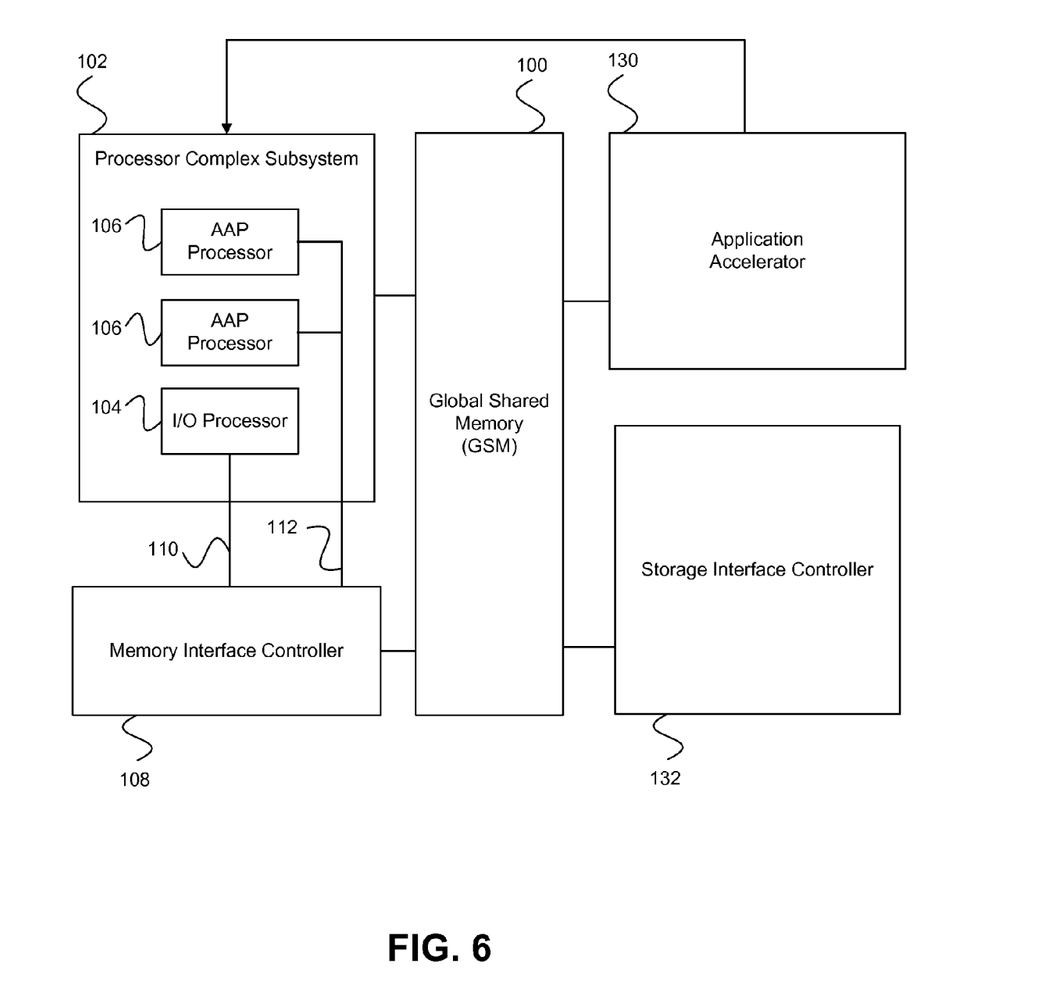
FIG. 6 illustrates a RAID controller system on a chip according to an embodiment of the present invention.

FIG. 6 illustrates a RAID controller system on a chip according to an embodiment of the present invention. The architecture utilizes a global shared memory switch (GSM) 100 as the primary interconnect and buffering mechanism for both the control path and the data path. Connected by the GSM interconnect are: the Processor Complex Subsystem 102 that includes a number of processors; a memory interface controller 108, such as a PCI and Memory Interface controller (PMIC) that incorporates the PCIe host interface, the DDR-II memory controller, and centralized Block DMA (BDMA) functions; an application accelerator 130, for example Raid Application Acceleration Engines (RAAE) that incorporate XOR, RAID-6, and cryptographic processing engines; and a storage interface controller 132, such as a single or multiple phy SAS/SATA protocol controller that provides phy/link/transport layer function for SAS and SATA protocol interfaces. For example, the storage interface controller 132 can be an Octal SAS/SATA Protocol controller (OSSP).

Embodiments of the present invention utilize a number of interconnect mechanisms to optimize system performance, including: a shared memory switch for control, data and queue access; a dedicated low latency, high speed bus from a CPU complex to a memory controller and PCIe outbound access logic for direct access from CPUs to external memory spaces; and a lower speed arbitrated configuration bus for device configuration and maintenance.

Figure 7:
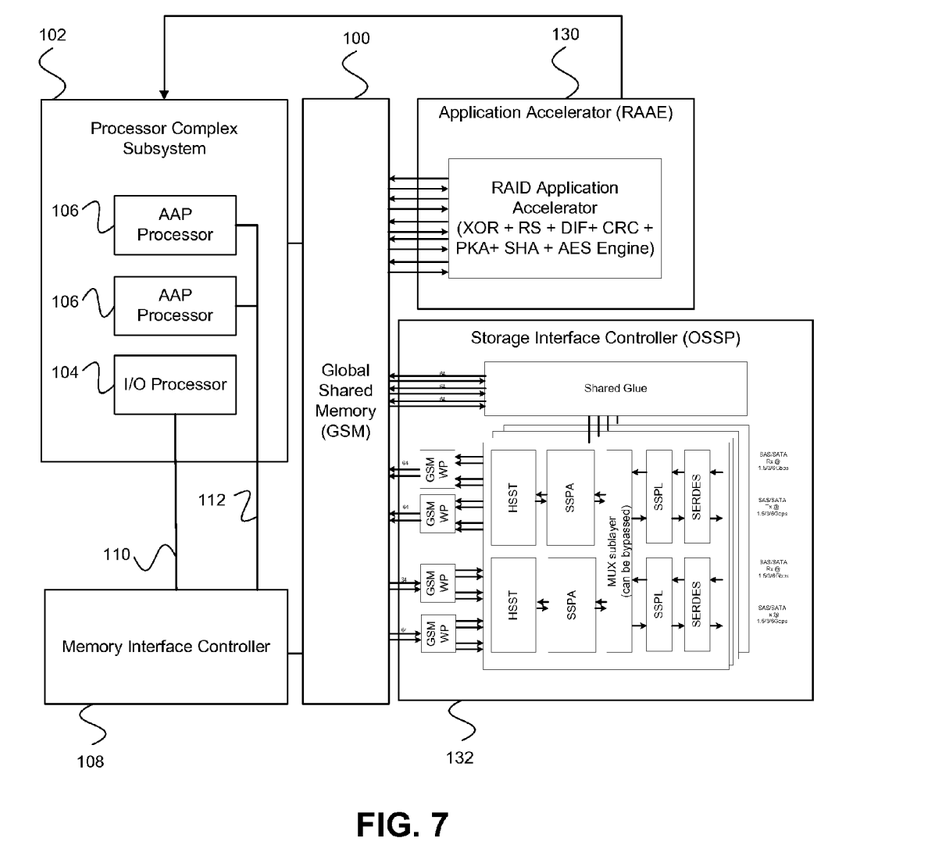
FIG. 7 illustrates an embodiment of the RAID controller system on a chip of FIG. 6.

FIG. 7 illustrates an embodiment of the RAID controller system on a chip of FIG. 6. The storage interface controller 132 provides physical, phy, link and transport layer functions for the storage interface supported. The storage protocols that can be supported include but are not limited to ATA, SCSI, Serial ATA (SATA), Serial Attached SCSI (SAS), Fibre Channel (FC), FCoE (Fibre Channel over Ethernet), iSCSI, FCIP. In a presently preferred embodiment, illustrated in FIG. 7, the storage interface controller can be a fully hardened Phy SAS/SATA controller, shown as an OSSP subsystem. In alternative embodiments, the layers of the selected protocol can be implemented as either pure hardware based, or a hybrid approach with a combination of hardware, micro-code sequencer, and firmware.

To support a large number of concurrent I/Os, there is a common requirement to support context structure that keeps track of relevant protocol state and buffer information, including context per IO (IO Context), context per device (IT context), context per phy, context per port. Some contexts can be maintained in flip-flops, while the larger context tables such as the IT and IO Contexts are much more cost effective to be maintained in RAMs. Typically the IT and IO context information needs to be accessed by both the processor that controls the IO and the protocol controller. Additionally, there are the queue data structures that maintain local requests, data frames, messages, remote transfer requests (such as XFER_RDY received).

In known approaches, the whole context and queue structure is typically maintained in off-chip memories. Because of the long latency of external memory, and the demand on memory bandwidth to do off-chip memory accesses, often caching techniques are applied to keep a small number of frequently accessed entries of these structures on-chip for fast access. Such an approach suffers from lower and less deterministic performance that is dependent on the traffic pattern that affects the effectiveness of caches. Moreover, there is more software CPU overhead for sharing/accessing the context and queue structures with proper synchronization with the hardware controller.

Embodiments of the present invention use on-chip GSM structures to store the context, queue and buffer structures that are shared between the CPUs and the hardware controller. The on-chip GSM structures can store context information and queues used by the application accelerator and the storage interface controller, and which can be shared between other masters. Since GSM can provide dedicated high bandwidth and relatively low latency to context structures and sufficiently large space for typical applications, it eliminates the complexity of caching structures and the synchronization overhead associated with the cache. The shared atomic accesses to the shared structure and queues are automatically provided for by the GSM arbitration scheme.

Furthermore, in known storage controllers, typically there is fixed amount of on-chip RAM that is associated with each channel of the controller. The RAM is often further split based into the receive buffer RAM and the transmit buffer RAM because of the high bandwidth requirement on the access of the buffer RAMs. This approach leads to fixed buffer allocation that can not be shared across receive path and transmit path and can not be shared across channels. Also in modern silicon implementations, the small buffer RAMs lead to relatively low area density, resulting in higher cost of buffer RAM per bit.

In embodiments of the present invention, the buffer space is provided in the GSM based on large RAMs that have much higher area density. The GSM can provide shared RAM space across the receive and transmit paths of multiple channels. Hence the global buffer pool can be flexibly reassigned or dynamically shared based on configuration or buffer sharing policy. This approach is not only lower cost, but also enables the buffer resources to be utilized more efficiently.

Embodiments of the present invention utilize the logical address facility provided by the global BDMA by posting DMA descriptors to GSM queues, which will be further described in this document. This approach removes the cost and overhead of maintenance of SGL context, and the traversal of SGL for address translation, and removes the DMA function entirely from the storage controller.

Also in FIG. 7, the application accelerator 130 is provided as a RAID application accelerator. The application accelerator can provide acceleration functions including, but not limited to XOR computation, AES encryption/decryption, public key cryptographic operations, T10 Data Integrity Field (DIF) check/computation/replacement functions. Most of these operations are based on input data blocks, and generate output data blocks.

Embodiments of the present invention rely on the GSM queues to communicate operation requests and/or operation results between the requestor and the processing engines. Embodiments of the present invention rely on GSM buffers to store the source and destination data blocks. Embodiments of the present invention rely on GSM to store the context information required to support concurrent operations.

These aspects of embodiments of the present invention are similar to the storage interface controller handling of descriptors/queues/contexts/buffers.

Referring back to FIG. 4, some aspects regarding the block DMA 124 will now be discussed. The DMA, the host interface and the external memory interfaces can be tied closely together in the present invention in the PMIC subsystem as shown in FIG. 4 to ease the heavy traffic load across these system components.

An embodiment of the present invention provides the following paths of access: from IOP (Input/Output Processor) CPU directly to the memory controller; from IOP CPU and AAP (Application Acceleration Processor) CPUs to PCIe outbound; from AAP CPU to memory controller; PCIe inbound to memory controller; PCIe inbound to GSM; PCIe inbound to slow speed configuration bus; BDMA to GSM; BDMA to memory controller; BDMA to PCIe outbound.

Such paths are created to provide flexibility from any master (IOP/AAP processors, PCIe host, and BDMA) to any slave memory space (external memory, GSM on-chip memory, configuration bus, PCIe host memory).

BDMA provides novel capabilities for handling data movement, including the following:

1. Centralized DMA that provides the data movement function for all system blocks.

2. Hole insertion and deletion function along with data movement.

3. Logical address to Physical address translation function provided by the DMA based on a plurality of scatter/gather functions that support partial SGL partial buffer transfer per DMA operation. The DMA master can request arbitrary length DMA transfer at arbitrary starting position using logical address, while the DMA engine does the address translation from logical address to SGL fragment physical addresses.

4. Use of caching techniques to reduce the need to traverse the SGL for address translation purposes. Support a plurality of simultaneous transfers that are time interleaved with each other with frequent context switching.

5. Support free/request/complete 3 stage and request/complete 2 stage model of descriptor passing based on GSM queues.

6. Support pass by reference and pass by value scheme as the mechanisms for the descriptor communication. The descriptor can be located in GSM, or other types of physical memory.

7. Support independent channel for independent direction of data movement between DDR, GSM and PCI memory as described above. Each channel handles one direction of movement based on source/destination memory space pair. For example, DDR→GSM, GSM→PCI are considered to be independent direction of data movement. Hence transfers on these two directions can be executed in parallel without waiting for each other. The independent queues per channel eliminate the unnecessary head of line blocking from which a normal common request queue architecture suffers. An embodiment of the present invention supports zero or a plurality of DMA channels per direction of movement and can be extended to support a lesser or greater number of independent parallel physical memory spaces.

8. Multiple prior queues per direction. This allows higher priority DMA transfers to jump ahead to be executed without suffering long latency of staying behind a long low priority transfer that was started earlier.

Embodiments of the present invention can be implemented in SAS RAID controllers, and in SAS protocol controller devices.

Embodiments of the present invention directly impact the RAID controller architecture within the server and external storage RAID controller markets. Considering the high attach rate of ROC in high volume server market, embodiments of this invention could directly affect how every server in the world is made.

In the preceding description, for purposes of explanation, numerous details are set forth in order to provide a thorough understanding of the embodiments of the invention. However, it will be apparent to one skilled in the art that these specific details are not required in order to practice the invention. In other instances, well-known electrical structures and circuits are shown in block diagram form in order not to obscure the invention. For example, specific details are not provided as to whether the embodiments of the invention described herein are implemented as a software routine, hardware circuit, firmware, or a combination thereof.

Embodiments of the invention can be represented as a software product stored in a machine-readable medium (also referred to as a computer-readable medium, a processor-readable medium, or a computer usable medium having a computer-readable program code embodied therein). The machine-readable medium can be any suitable tangible medium, including magnetic, optical, or electrical storage medium including a diskette, compact disk read only memory (CD-ROM), memory device (volatile or non-volatile), or similar storage mechanism. The machine-readable medium can contain various sets of instructions, code sequences, configuration information, or other data, which, when executed, cause a processor to perform steps in a method according to an embodiment of the invention. Those of ordinary skill in the art will appreciate that other instructions and operations necessary to implement the described invention can also be stored on the machine-readable medium. Software running from the machine-readable medium can interface with circuitry to perform the described tasks.

The above-described embodiments of the invention are intended to be examples only. Alterations, modifications and variations can be effected to the particular embodiments by those of skill in the art without departing from the scope of the invention, which is defined solely by the claims appended hereto.

What is claimed is:

1. A system-on-a-chip device comprising:
a plurality of parallel masters;
a global shared memory switch (GSM) structurally related as a slave with respect to the plurality of parallel masters and in communication therewith, the GSM including on-chip shared memory resources to provide an interconnect mechanism among hardware components, processors and software entities, the GSM arranged to arbitrate among the plurality of parallel masters to allow the plurality of parallel masters to concurrently access the shared memory resources;
the plurality of parallel masters including a processor complex subsystem and a memory interface controller,
the processor complex subsystem including a high priority processor and one or more low priority processors;
the memory interface controller, to manage memory access requests for a plurality of memory interfaces external to the processor complex subsystem;
the system-on-a-chip device further including,
a dedicated low latency physical path from the high priority processor to the memory interface controller to prioritize traffic from the high priority processor; and
an arbitrated physical path from the low priority processors to the memory interface controller, the arbitrated physical path having a higher latency than the dedicated low latency physical path,
wherein the GSM comprises,
a system wide GSM with high port count to connect all subsystems together; and
a smaller GSM with ports only connecting to the CPUs and the storage interface controller subsystem to provide context and/or queue storage for the storage controller.

2. The device of claim 1 wherein the GSM is provided as a primary interconnect and buffering mechanism for both a control path and a data path.

3. The device of claim 1 wherein the GSM comprises a unified addressing scheme for all on-chip resources, such that each processor has equal access to the resources via the unified addressing scheme.

4. The device of claim 1 wherein the plurality of memory interfaces comprise a double data rate (DDR) memory interface and a peripheral component interconnect (PCI) memory interface, and each processor has access to both DDR and PCI memory using the same addressing scheme.

5. The device of claim 1 wherein the GSM comprises on-chip GSM structures to store context, queue and buffer structures that are shared between processors and hardware controllers.

6. The device of claim 1 wherein the GSM comprises buffer space based on large RAMs to provide shared RAM space across receive and transmit paths of multiple high bandwidth channels that are implemented as separate hardware blocks, permitting the buffer space to be flexibly reassigned or dynamically shared based on configuration or buffer sharing policy.

7. The device of claim 1 wherein the GSM comprises GSM queues to communicate operation requests and/or operation results between a requestor and processing engines.

8. The device of claim 1 wherein the GSM comprises GSM buffers to store the source and destination data blocks.

9. The device of claim 1 wherein the GSM comprises context storage to store context information required to support concurrent operations.

10. The device of claim 1 wherein the GSM utilizes parallel random access memory (RAM) instances to strip data in order to provide high aggregate on-chip shared memory bandwidth for concurrent access across multiple masters.

11. The device of claim 1 wherein the on-chip shared memory resources comprise a global ring buffer including configurable sets of first in first out registers (FIFOs).

12. The device of claim 11 wherein the global ring buffer provides hardware signals to indicates a status of the FIFOs within the ring buffer that can be routed and multiplexed to various GSM masters, so that the hardware operations/CPU interrupts/events can be triggered by ring buffer status change.

13. The device of claim 1 wherein the dedicated low latency physical path has low arbitration latency characteristics and low physical path latency to memory.

14. The device of claim 1 further comprising, for each CPU:

a low speed arbitrated configuration bus for device configuration and maintenance, to provide accessibility from any CPU or external master to internal hardware configuration and status information without interference of high speed, high bandwidth control and data traffic.

15. The device of claim 1 further comprising:

an interrupt/event handler to categorize interrupt/event sources as latency critical and latency non-critical sources; and a direct crossbar to handle the latency critical sources and allow full programmability of connecting any critical interrupt source to any processor input pin.

16. The device of claim 15 further comprising:

an interrupt/event bus; and a plurality of interrupt/event gaskets, one for each processor, connected to the interrupt/event bus, each interrupt/event gasket providing programmable demultiplexing functions that allow each processor interrupt signal to take a value of a programmable time slot and bit position within the interrupt/event bus.

* * * * *